(12) United States Patent
Flaschentrager et al.

(10) Patent No.: US 9,404,542 B2
(45) Date of Patent: Aug. 2, 2016

(54) SHAFT ARRANGEMENT AND METHOD FOR RELAYING TORQUES ACTING AROUND A ROTATIONAL AXIS

(71) Applicant: FRAUNHOFER-GESELLSCHAFT ZUR FORDERUNG DER ANGEWANDTEN FORSCHUNG E.V., Munich (DE)

(72) Inventors: David Flaschentrager, Darmstadt (DE); Jan Hansmann, Darmstadt (DE); Tobias Melz, Darmstadt (DE)

(73) Assignee: FRAUNHOFER-GESELLSCHAFT ZUR FORDERUNG DER, Munich (DE)

( * ) Notice: Subject to any disclaimer, the term of this patent is extended or adjusted under 35 U.S.C. 154(b) by 0 days.

(21) Appl. No.: 14/362,152

(22) PCT Filed: Nov. 29, 2012

(86) PCT No.: PCT/EP2012/004932
§ 371 (c)(1),
(2) Date: Jun. 2, 2014

(87) PCT Pub. No.: WO2013/079203
PCT Pub. Date: Jun. 6, 2013

(65) Prior Publication Data
US 2015/0159700 A1 Jun. 11, 2015

(30) Foreign Application Priority Data
Dec. 2, 2011 (DE) .......................... 10 2011 120 095

(51) Int. Cl.
*F16D 3/06* (2006.01)
*F16D 3/12* (2006.01)
*F16F 15/18* (2006.01)
*F16F 15/32* (2006.01)
*F16C 3/03* (2006.01)
*F16F 1/14* (2006.01)

(52) U.S. Cl.
CPC ... *F16D 3/06* (2013.01); *F16C 3/03* (2013.01); *F16D 3/12* (2013.01); *F16F 1/14* (2013.01);
(Continued)

(58) Field of Classification Search
CPC ........ F16C 1/108; F16C 3/03; F16C 2326/01; F16D 3/06; F16D 3/12; F16D 3/20; F16D 3/52; F16D 3/56; F16D 3/58; F16F 1/14; F16F 1/145; F16F 1/16; F16F 15/18; F16F 15/322; Y10T 464/50
USPC ......... 464/81, 85, 86, 97, 100, 147, 155, 162, 464/180
See application file for complete search history.

(56) References Cited

U.S. PATENT DOCUMENTS

| 2,238,380 | A | | 8/1939 | Almen |
| 2,598,780 | A | * | 6/1952 | Garnier ..................... F16D 3/06 403/166 |

(Continued)

FOREIGN PATENT DOCUMENTS

| DE | 31 28 959 C2 | 4/1982 |
| DE | 100 02 259 A1 | 7/2000 |
| EP | 2 278 183 A1 | 1/2011 |

*Primary Examiner* — Josh Skroupa
(74) *Attorney, Agent, or Firm* — Fitch, Even, Tabin & Flannery LLP (57) ABSTRACT

A shaft arrangement is disclosed for transmitting torques acting around a rotational axis, with a variably adjustable torsional stiffness acting around the rotational axis and a method for varying the torsional stiffness of a shaft arrangement. The invention includes a first shaft section, having at least one torsion element secured thereto which is not damaged by torque and is axially fixed manner, which is mounted to be dimensionally stable transverse to the rotational axis, a second shaft section spaced axially apart from the first shaft section, to which the at least one torsion element is secured which is not rotatable but is axially movable and that a means for operatively interacts or can be made to operatively interact with the second shaft section for axially moving the second shaft section in relation to the first shaft section and in relation to the at least one torsion element.

27 Claims, 3 Drawing Sheets

(52) U.S. Cl.
CPC ................ *F16F 1/145* (2013.01); *F16F 15/18* (2013.01); *F16F 15/322* (2013.01); *F16C 2326/01* (2013.01); *Y10T 464/50* (2015.01)

(56) References Cited

U.S. PATENT DOCUMENTS

| | | | |
|---|---|---|---|
| 2,612,773 A | 10/1952 | Beadle | |
| 2,872,225 A * | 2/1959 | Walker, Jr. | F01C 17/06 279/906 |
| 3,272,492 A * | 9/1966 | Jones | B60G 11/187 267/154 |
| 4,214,458 A | 7/1980 | Philleo | |
| 4,551,115 A * | 11/1985 | Ferguson | F16D 3/12 464/160 |
| 4,812,072 A * | 3/1989 | Brooks | F16C 11/12 403/24 |
| 5,443,247 A | 8/1995 | Politres et al. | |
| 6,241,224 B1 * | 6/2001 | Leibman | F16F 1/14 267/189 |
| 7,497,781 B2 | 3/2009 | Cunningham et al. | |
| 2004/0016857 A1 | 1/2004 | Jaumann | |

* cited by examiner

SHAFT ARRANGEMENT AND METHOD FOR RELAYING TORQUES ACTING AROUND A ROTATIONAL AXIS

CROSS REFERENCE TO RELATED APPLICATION

Reference is made to German Patent Application Serial No. DE 10 2011 120 095.2, filed Dec. 2, 2011, which application is incorporated herein by reference in its entirety.

BACKGROUND OF THE INVENTION

1. Field of the Invention

The invention relates to a shaft arrangement for relaying torques acting around a rotational axis, with a variably adjustable torsional stiffness acting around the rotational axis. Further, the invention relates to a method for relaying torques acting around a rotational axis with a variably adjustable torsional stiffness acting around a rotational axis.

2. Description of the Prior Art

Rotating systems for transferring rotational movements and torques, for example in the form of mechanical shafts, are subject to operationally induced torsional loads, which can lead to the formation of disruptive rotational oscillations, in particular given a discontinuous introduction of torque along the shaft. In particular shafts with a long and slender design, which only have a low torsional stiffness for systemic and structural reasons, tend to form such rotational or torsional oscillations, which additionally have resonant natural oscillations at already low frequencies, and hence can permanently detract from the operational comfort and operational acoustics. In all instances, these oscillations at the very least detract from the operational stability and associated system loadability of the respective shaft.

Typical examples of rotation transferring systems that are sensitive to rotational oscillations include drive trains in motor vehicles, especially since power output in internal combustion engines does not take place continuously through the individual cylinders, as a result of which the power output of the engine as a whole is accompanied by torque fluctuations, which have an especially detrimental impact in particular in cases where the frequency of these fluctuations lies within or is proximate to the natural frequencies for the ensuing rotationally movable systems in the drive train, for example the power train, transmission, steering system, etc. In these instances, the discontinuities caused by the internal combustion engine can lead to elevated oscillation loads, wear and noise generation, which noticeably detract from driving comfort.

In order to counteract such rotational oscillations, it obviously makes sense to elevate the torsion resistance of rotationally movable components with structural measures, most often by using stable shafts with as massive a design as possible, although this results in an undesired increased weight for the overall system, which would not appear to be beneficial in terms of cost and energy savings. Rather, it is imperative to find solutions that reflect the principles of lightweight construction, and also help effectively prevent oscillations from arising along rotating shafts of the kind described above.

One known possibility involves the use of oscillation damping components along a shaft arrangement that transfers the rotational movement. German Patent DE 100 02 259 A1 discloses a torque transferring device, in particular for the drive train of a motor vehicle, having a disk-shaped, axially elastic component whose axial elasticity is generated by providing suitably arranged transected areas in the form of a local component perforation. The disadvantage is that the transected areas yield a torsional stiffness characterizing the component that is irreversible and fixed. As a consequence, while rotational oscillations can be dampened within a fixed frequency range, work, ageing or system-related, frequency-specific changes take place in the arising natural frequencies of the rotational oscillations, causing the known torque transferring device to reach its technical limits.

By contrast, the shaft described in EP 2 278 183 A1 permits a variable adjustability of its torsional stiffness. To this end, at least one shaft section along the shaft referred to as a so-called torsion rod is provided with a shaft cross section that is reduced in relation to the remaining shaft region, and has a lower torsional stiffness than the remaining shaft region. Also provided is a tubular shifting collar that can be moved along the shaft, and is designed and situated in such a way as to bridge the area of the torsion rod, thereby directly joining the adjacent shaft sections together. In this way, the torsional stiffness of the shaft can be adjusted at least between two discrete stiffness values by moving the tubular shifting collar.

Even though it is possible to expand on the approach described above of gradually changing the torsional stiffness and increase the number of discretely adjustable torsional stiffness levels by providing several previously referenced torsion rods with respectively different torsion rod diameters along the shaft, the goal is still to have as smooth, that is, continuous variability for the torsional stiffness of a shaft arrangement acting around a rotational axis.

In particular with respect to the use of reduced-weight materials, for example light metals, fiber-reinforced composites, etc., the goal is to find solutions that are able to effectively suppress the formation of rotation-induced, disruptive oscillatory phenomena along rotating shaft arrangements.

SUMMARY OF THE INVENTION

As a consequence, the invention is further develops a shaft arrangement for relaying torques acting around a rotational axis with a variably adjustable torsional stiffness acting around the rotational axis in such a way that the torsional stiffness of the shaft arrangement around the rotational axis can be varied continuously, that is, smoothly. The measures to be taken for this purpose are to be realized with technically simple and cost-effective means, meet the standards in lightweight construction, and allow virtually any scalability desired. This makes it possible to realize shaft arrangements with a continuously adjustable torsional stiffness in both the macro and microscopic dimensional range.

One shaft arrangement according to the invention for relaying torques acting around a rotational axis with a variably smoothly adjustable torsional stiffness acting around the rotational axis is characterized by the fact that a first shaft section is provided along the shaft arrangement having secured to it in a torque-proof and axially fixed manner at least one torsion element that relays the torques, which is designed and/or mounted in a dimensionally stable manner transverse to the rotational axis. Also provided spaced axially apart from the first shaft section is a second shaft section, to which the at least one torsion element is secured or mechanically rail guided in a rotation-proof and axially movable manner. Finally means is provided that operatively interacts or can be made to operatively interact with the second shaft section, and can be used to deflect the second shaft section in an axially movable manner in relation to the first shaft section and to the at least one torsion element.

The invention which provides a smooth adjustment of the torsional stiffness along a shaft arrangement is based on the structural reality that the torsional stiffness of a shaft, however it may be configured, depends on its effective length along which the shaft can transfer rotational movements, and hence torques. If the effective length of the shaft is reduced, the torsional stiffness acting around the rotational axis of the shaft also increases at the same time.

The shaft arrangement according to the invention uses the structural and mechanical reality described above in such a way as to alter the effective length of the at least one torsion element provided between the first and second shaft section by continuously varying the distance between the two shaft sections. Depending on the distance selected, the torsional stiffness of the at least one torsion element acting around the rotational axis varies. If the distance between the two shaft sections is reduced to zero, i.e., both shaft sections directly abut each other axially, the at least one torsion element does not contribute to the torsional stiffness of the shaft arrangement, with the torsional stiffness in this case being at its maximum and only determined by the shaft sections themselves. As the axial distance between the two shaft sections increases, the torsional stiffness of the shaft arrangement diminishes, since there is a continuous rise in the effective length of the at least one torsion element, and hence in the twistability of the at least one torsion element. In order to be able to influence the torsion behavior of the shaft arrangement, it must be ensured that the at least one torsion element exhibits a lower torsional stiffness along the shaft arrangement than the respective first and second shaft sections.

The at least one torsion element is preferably designed as a rod or cord, meaning that it possesses a longitudinal extension. In cases where only a single torsion element is provided between the first and second shaft section, the torsion element must be arranged centrally relative to the rotational axis between the two shaft sections, so that the torsion element itself does not generate any rotationally induced unbalanced moments. On the other hand, in order to ensure that the second shaft section can move axially relative to the torsion element, and also that rotation is prevented between the second shaft section and torsion element, the rod- or cord-shaped torsion element exhibits a cross sectional shape deviating from the circular cross section, at least in the area where the torsion element is joined or mounted with the second shaft section. The torsion element is preferably joined positively inside the second shaft section, that is, the second shaft section exhibits an opening tailored to the outer contour of the torsion element, through which the torsion element can be pushed axially alongside the rotational axis. In order to ensure that the second shaft section can move longitudinally relative to the torsion element, the positive connection between the torsion element and second shaft section has a clearance.

Also possible for the shaft arrangement according to the invention are exemplary embodiments in which two or more torsion elements can be provided between the first and second shaft sections, which are each unilaterally secured with the first shaft section in a rigid, that is, torque-proof, and also axially fixed manner, and on the other hand are mounted in a rotation-proof, yet axially movable manner inside the second shaft section. Given several torsion elements, the goal is to situate the latter in and/or around the rotational axis of the shaft arrangement in such a way that no rotationally induced unbalanced moments are caused by the torsion elements themselves, just as in the case described above. For this reason, the torsion elements are preferably to be uniformly distributed around the rotational axis.

In a preferred embodiment, the shaft arrangement according to the invention can be integrated along a shaft that transfers rotational movements and torques, whose one shaft end is joined with a drive, and whose other shaft end is joined with an output. In the case at hand, the shaft portion connected with the drive corresponds to the first shaft section designed above, while the shaft portion connected with the output corresponds to the second shaft section. The rotational movement to be transferred alongside the shaft and torques associated therewith are hence transferred in the region between the first and second shaft section via the at least one torsion element. Depending on the formation of possible rotational oscillations around the rotational axis of the shaft, the torsional stiffness of the shaft, which to a critical extent is determined by the torsional stiffness of the at least one torsion element, can be adjusted to a significant degree, making it possible to effectively dampen the frequency-specific rotational oscillations.

Another application for the shaft arrangement according to the invention involves configuring the shaft arrangement in the form of a rotational dynamic oscillation absorber. In this case, the at least one torsion element does not act as a functional part for transferring rotational movements and torques along a shaft. Rather, the at least one torsion element represents the mechanical link to an inertial mass that serves as a mass damper, and can extract oscillation energy from a rotating system in a targeted manner in the event of disruptive rotational oscillations. In such an exemplary embodiment, the first shaft section is joined with a shaft intended for dampening oscillation, or comprises a shaft part of the shaft. The second shaft section of the shaft arrangement according to the invention is loosely mounted in relation to the shaft intended for dampening oscillation, and is only joined with the first shaft section via the at least one torsion element. If torsional oscillations arise along the shaft, the latter are transferred as a function of the set torsional stiffness along the at least one torsion element to the second shaft section that serves as the mass damper, and has imparted to it rotational oscillations that are time-delayed due to inertia. In order to eliminate the disruptive rotational oscillations arising along the rotating shaft as effectively as possible, the torsional stiffness of the at least one torsion element must be adjusted in such a way that the mass damper is made to counter-oscillate relative to the disruptive rotational oscillations, thereby extracting oscillation energy from the disruptive rotational oscillations. The oscillation energy extracted from the disruptive rotational oscillations is invested in the deformation energy of the at least one torsion element that undergoes continuous torsional deformation.

The smoothly adjustable torsional stiffness of the shaft arrangement designed according to the solution makes it possible to target and effectively dampen disruptive rotational oscillations that arise in the form of structurally specific, resonant natural frequencies or originate from drive-side excitation frequencies.

The exemplary embodiment for a rotational dynamic oscillation absorber described above can optionally be advantageously expanded in relation to the dynamic oscillation behavior of the second shaft section serving as a mass damper by the following supplementary measures.

In addition to the torsion stiffness depending on the effective length of the at least one torsion element, the torsion stiffness of the torsion element can also be influenced by the application or integration of one or more converter materials alongside or in the at least one torsion element. In particular, the dampening behavior of the at least one torsion element can be influenced in this way. Materials that are able to blend forms of energy are referred to as converter materials. Typically designated as converter materials are piezoceramics, electroactive or piezoelectric polymers, electrostrictive or magnetostrictive ceramics, smart metals or smart polymers.

In a preferred exemplary embodiment, an application of piezoceramic material along the at least one torsion element, or integrate therein is used. The deformation performed on the piezoceramic when torsional oscillations arise is converted into electrical energy which, for example, can be specifically extracted for another use. As a consequence, oscillation energy can in this way be additionally extracted from the rotationally oscillating system via conversion into electrical energy. The electrical energy can be used in a suitable manner.

Another option involves using an electro- and/or magnetorheological fluid, which is provided in or around the second shaft section serving as the mass damper. Depending on the setting of the viscosity for the electro- or magnetorheological fluid, which can be varied by applying an electric or magnetic field, influence can be exerted on the friction, and hence the rotatory mobility of the second shaft section serving as the mass damper, ultimately affecting the dampening and oscillation behavior of the second shaft section serving as the mass damper. Additional details relating hereto are provided from the further specification, which refers to the exemplary embodiments shown on the figures.

Adjusting the torsional stiffness of the shaft arrangement according to the invention requires a means that operatively interacts or can be made to operatively interact with the axially movable second shaft section, and causes a deflection of the second shaft section oriented alongside the rotational axis, depending on the technical application. These actuating elements can take on varying configurations, for example that of an electrodynamic spindle drive, which moves the second shaft section relative to the first shaft section. In the most general sense, use can also be made of rotary drives which are able to convert a rotational movement into a linear movement by means of gearing mechanisms, making it possible to initiate the above axial motion of the second shaft section. In like manner, a corresponding linear displacement is enabled by electrodynamic linear motors or linear drives or options for longitudinal maneuverability based on piezo technology, for example in the form of an inchworm motor. It is also conceivable to deflect the second shaft section in a linearly movable manner relative to the first shaft section by hydraulic or pneumatic forces. Further conceivable is the use of centrifugally-assisted actuating elements is possible, that is, centrifugal governors, which are able to change the axial distance between the two shaft sections as a function of the shaft speed and centrifugal force associated therewith.

BRIEF DESCRIPTION OF THE DRAWINGS

The invention will be exemplarily described below without limiting the invention based upon exemplary embodiments, making reference to the drawings.

DETAILED DESCRIPTION OF THE INVENTION

Figure 1:
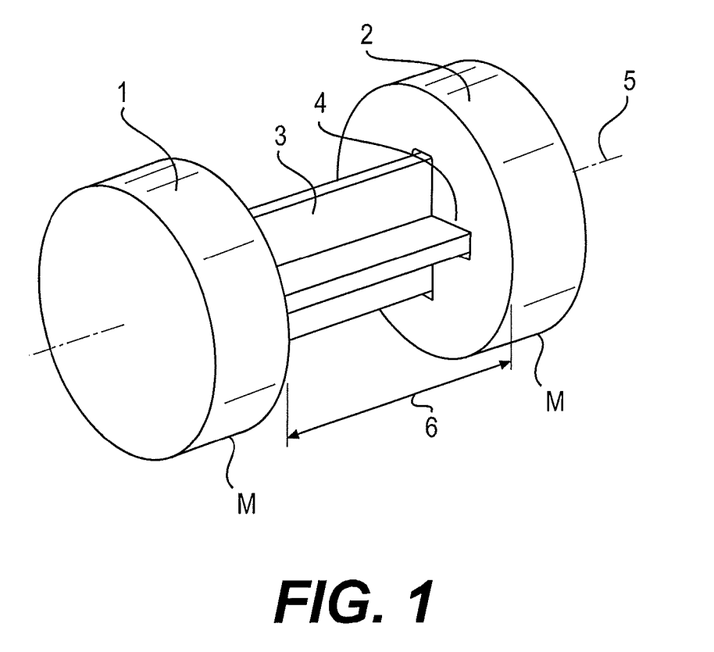
FIG. 1 is a shaft arrangement with a single torsion element.

FIG. 1 depicts a shaft arrangement that is pivoted around a rotational axis 5, whose torsional stiffness acting around the rotational axis 5 can be smoothly adjusted within certain limits. The shaft arrangement includes a first shaft section 1 along with a second shaft section 2, which operatively interact with each other by way of a torsion element 3. The two shaft sections 1 and 2 are mounted so that they can move relative to each other along the rotational axis 5. The torsion element 3, which is a rod or a cord profile having a cross-shaped cross section, is to this end unilaterally rigidly joined on the face with the first shaft section 1. That is, the torsion element 3 is firmly secured to the first shaft section 1 in a torque-proof and axially fixed manner. In contrast, the second shaft section 2 has a cross-shaped opening 4, through which the torsion element 3, which also has a cross-shaped cross section, can be passed in a precisely fitting and axially movable manner alongside the rotational axis 5. Because the cross sectional contour of the torsion element 3 deviates from the circular shape and is here shaped like a cross, the torsion element 3 is joined so that it cannot rotate in relation to the second shaft section 2, although the second shaft section 2 can be axially movably displaced along the rotational axis 5 in a longitudinal extension to the torsion element 3. Axially displacing the second shaft section 2 alongside the torsion element 3 changes the application of force on the torsion element 3 as the shaft arrangement turns around the rotational axis 5. This results in a corresponding change in the torsional stiffness of the torsion element 3 depending on the effective free length 6 of the torsion element 3, and hence of the entire shaft arrangement. The torsional stiffness basically increases as the free axial length 6 of the torsion element 3 decreases. That is, if both shaft sections 1 and 2 are spaced a great distance apart from each other, the torsional stiffness of the shaft arrangement is small by comparison to a configuration with a small distance between both shaft sections 1 and 2. If both shaft sections 1 and 2 axially abut against each other without a gap, the torsion element 3 contributes nothing to the torsional stiffness of the shaft arrangement.

The exemplary embodiment illustrated on FIG. 1 only exhibits a single torsion element 3, which is secured between both shaft sections 1 and 2 centrically relative to the rotational axis 5. In order to longitudinally displace the second shaft section 2 relative to the first shaft section 1, the second shaft section must be controllably displaced. This is accomplished with an adjusting means M, whose interaction with the second shaft section 2 on FIG. 1 is only shown diagrammatically. The adjusting means M can be designed as an actuating element, for example as a spindle drive secured between the two shaft sections 1 and 2 or similar axially acting mechanisms.

Figure 2:
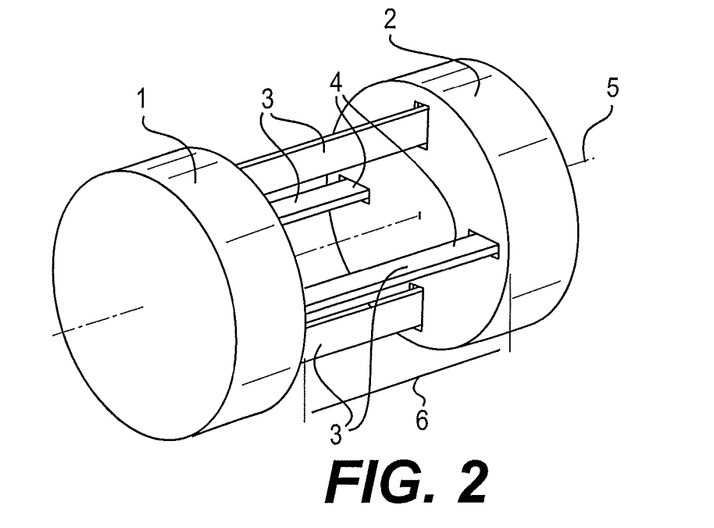
FIG. 2 is a shaft arrangement with several torsion elements.

FIG. 2 shows an exemplary embodiment for a shaft arrangement designed according to the invention with respectively four separate torsion elements 3 that are attached between the first and second shaft sections 1 and 2, and, in comparison to the exemplary embodiment according to FIG. 1, are unilaterally and firmly secured with the first shaft section 1 being in a torque-proof and axially fixed manner On the other hand, the second shaft section 2 provides suitably designed openings 4 through which the individual torsion elements 3 positively extend, so that the torsion elements 3 are secured against rotation, but can move axially relative to the second shaft section 2. Given two or more torsion elements (four torsion elements as illustrated), arranged symmetrically to the rotational axis 5, so that no unbalanced moments can arise as the shaft arrangement turns around the rotational axis 5. All conceivable cross sectional shapes are basically available to be used as the torsion elements, thus also including a circular cross sectional shape. For example, situating the four torsion elements 3 outside the rotational axis 5 makes it possible to provide an axially operating actuator (not shown) along the rotational axis 5, which can be used to effect the axial positional displacement of the second shaft section 2 relative to the first shaft section 1. In addition to the already mentioned structural shape of such an actuator as an electromechanical spindle drive, use can also be made of alternative electrodynamic linear drives, along with piezo drives.

Figure 3:
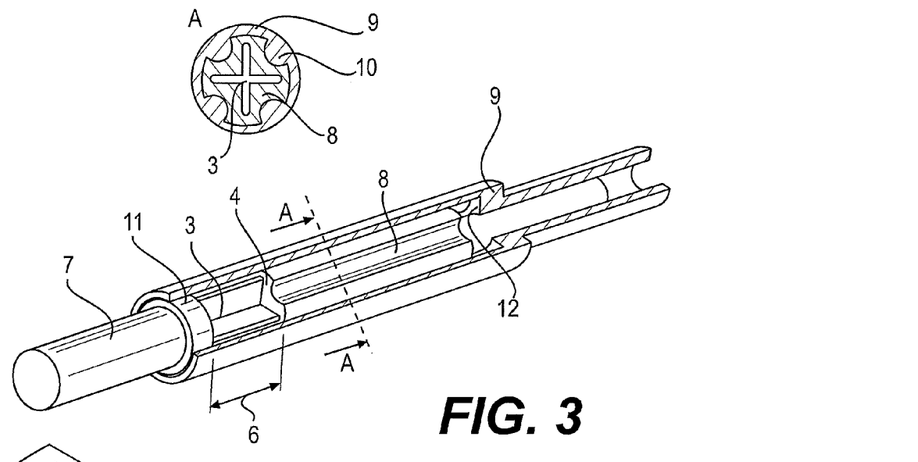
FIG. 3 is a shaft with adjustable stiffness.

FIG. 3 presents an exemplary embodiment for a shaft with continuously adjustable torsional stiffness, which has a drive shaft section 7 and output shaft section 9. The drive shaft section 7 is axially joined with the torsion element 3 in a torque-proof and axially fixed manner, and thus corresponds to the first shaft section 1 as well as the torsion element 3 connected thereto in the exemplary embodiment according to FIG. 1.

The torsion element 3 according to FIG. 3 projects into an opening 4 that is recessed and counter-contoured relative to the cross section of the torsion element 3 and arranged inside an axially situated carriage 8. The carriage 8 is positioned so that it can move axially relative to the torsion element 3, and is additionally enveloped by a shaft output section 9 configured as a hollow shaft. The outer contour of the axially movable carriage 8 exhibits axially running grooves or notches 10 (see sectional drawing on FIG. 3), into which portions of the output shaft section 9 configured like a hollow shaft engage, so that the axially movable carriage 8 with the output shaft section 9 (designed as a hollow shaft) is joined in a torque-proof manner, and hence synchronously co-rotated with the output shaft 9. In the exemplary embodiment illustrated on FIG. 3, the shaft output 9, resembling a hollow shaft, forms a frontal, preferably fluid-tight seal with the drive shaft 7 by way of a pivot bearing 11. In this way, the shaft region along which the torsion element 3 extends is hermetically enveloped both axially and radially by the shaft output 9 configured like a hollow shaft.

Shifting the carriage 8 inside the drive shaft 9 (resembling a hollow shaft) varies the effectively free length 6 of the torsion element 3, without changing the distance between the drive shaft 7 and output shaft 9 in the process. If the goal is to reduce the torsional stiffness of the shaft arrangement illustrated on FIG. 3, the carriage 8 must be shifted into a rightward position, in which the carriage 8 unilaterally abuts against the inner mechanical stop 12 that reduces the hollow shaft cross section. By contrast, if the objective is to maximize torsional stiffness, the carriage 8 is shifted as close as possible to the fluid-tight pivot bearing 11. For example, the ease with which the carriage 8 can be axially moved can be influenced with the help of inductive or magnetic interactive mechanisms that do not come into contact with the shaft.

Figure 4:
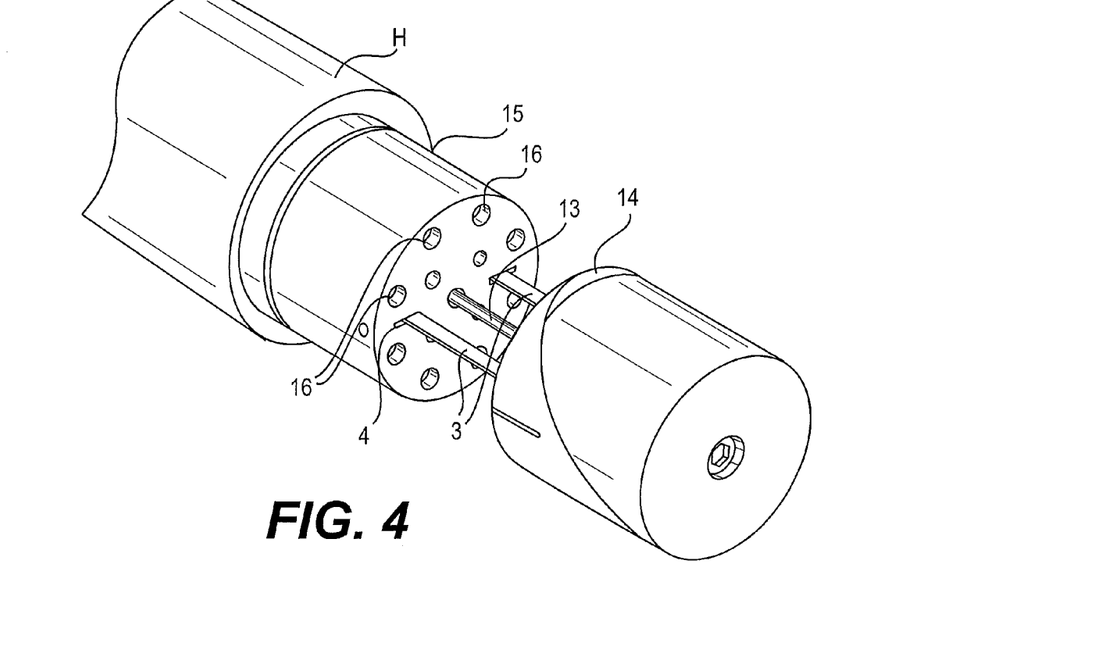
FIG. 4 is a shaft arrangement in the form of a rotational dynamic oscillation absorber.

FIG. 4 illustrates a shaft arrangement designed like a rotational dynamic vibration absorber, which is based on the same operating principle as the shaft arrangements described on FIGS. 1 and 2. It is assumed that the rotational dynamic vibration absorber shown on FIG. 4 is mounted inside a hollow shaft H that transmits rotational motion and torque, and is only partially depicted on FIG. 4 to provide a clearer overview. For this purpose, the rotational dynamic vibration absorber has a component 14 that can be mounted inside the hollow shaft (not depicted in any more detail) in an axially fixed and torque-proof manner, and represents a wedge bond that can be placed and fixed inside the hollow shaft to prevent twisting and axial displacement. In comparison to the exemplary embodiments illustrated on FIGS. 1 and 2, the wedge bond 14 represents the first shaft section. Unilaterally secured on the face of the component 14 in an axially fixed and torque-proof manner are two torsion elements 3, along which an inertial or damper mass 15 can be guided in an axially movable manner, as in the second shaft section 2 described above. In order to longitudinally shift the inertial mass 15 in an axially oriented manner relative to the torsion elements 3, an actuator 13 is also provided, which joins the inertial mass 15 with the wedge bond 14. Shifting the inertial mass 15 along the rotational axis 5 via the actuator 13 correspondingly alters the effective length 6 of the torsion elements 3, and thus the torsional stiffness. Altering the torsional stiffness simultaneously changes the intrinsic frequency of the rotation damper, so that the damper frequency can in this way be individually adjusted and varied during operation.

In the case of the rotational dynamic oscillation absorber situated inside a hollow shaft, the inertial mass 15 is loosely accommodated inside the hollow shaft, and joined with the hollow shaft via the wedge bond 14 only by the torsion elements 3 along with the actuator 13 provided for axial displacement. As a result, the oscillation amplitudes of the hollow shaft that arise with the disruptive rotational oscillations can be reduced through the resonant excitation of the rotational dynamic oscillation absorber, thereby effectively damping the disruptive rotational oscillations along the shaft. Given a change in the frequency of the disruptively arising rotational oscillations along the hollow shaft, for example because the power output range is changed or other mechanical systems are coupled to the shaft, the damper frequency can be readjusted by changing the torsional stiffness by controllably altering the distance between the inertial mass 15 and wedge bond 14.

Figure 5:
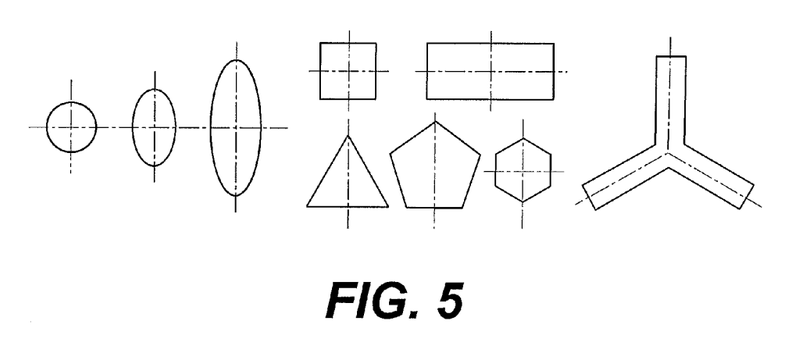
FIG. 5 are alternative examples for different cross sectional geometries for the at least one torsion element.

Of course, the torsion elements 3 depicted in FIG. 4 can also configured with cross sections deviating from a rectangular shape as, for example, with cross sections not shown in their entirety in FIG. 5. The same also holds true for the torsion elements on FIGS. 1 to 3.

Securing two torsion elements 3 outside the rotational axis 5, for example as depicted on FIG. 4, makes it possible to also design the torsion elements 3 with a circular cross section. However, this cannot be done when using only a single torsion element secured centrally to the rotational axis 5, for example as described in the exemplary embodiment on FIG. 1, especially since a torque-proof attachment of the torsion element to the respective second shaft arrangement would not be possible in this case.

Figure 6:
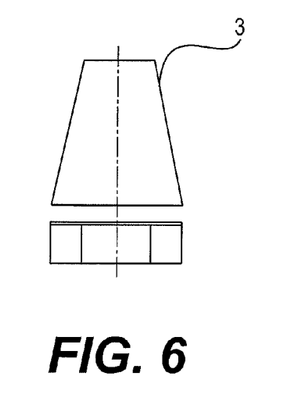
FIG. 6 is a torsion element with variable cross section in the longitudinal direction.
Figure 7:
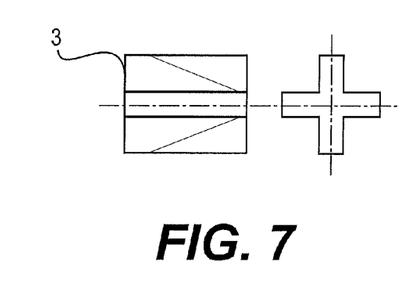
FIG. 7 is a torsion element having a cross-shaped cross section.

Another possibility is for the at least one torsion element to be a variable cross section in the longitudinal extension, for example as may be gleaned from the exemplary embodiments according to FIGS. 6 and 7. FIG. 6 shows a torsion element 3 shaped like a sleeve which is conically tapered in the longitudinal extension, while FIG. 7 illustrates a torsion element 3 having a cross-shaped cross section, wherein the cross section unilaterally tapers on the face.

Drawing reference to the exemplary embodiment illustrated on FIG. 4 for a rotational dynamic oscillation absorber, a supplementary measure for influencing the oscillation behavior of the inertial mass 15 will be described below.

As already explained, since the rotational dynamic oscillation absorber is situated inside a hollow shaft (not shown), the interior of the hollow shaft encompasses a volume that incorporates both the torsion elements 3 and the inertial mass 15, spaced apart from the interior wall of the hollow shaft.

When this volume or at least part of this volume is filled with a fluid, the fluid exerts a damping effect on the oscillation behavior of the inertial mass 15. If an electro or magnetorheological liquid is preferably used as the fluid, with a viscosity that can be altered by application of a corresponding electrical or magnetic influence, the oscillating behavior of the inertial mass 15, and thus the damping effect, can be actively influenced by the viscosity set for the fluid. To increase the interaction between the fluid and inertial mass 15, it further makes sense to provide the inertial mass 15 with through channels 16 oriented axially and longitudinal to the rotational axis, so that at least portions of the fluid pass through the inertial mass 15. In this way, changing the viscosity of a correspondingly selected fluid makes it possible to exert an elevated influence on the rotational mobility of the inertial mass 15 within the fluid. It is also conceivable to seal the through channels 16 introduced inside the inertial mass 15 with a suitable sealing means, so as to in this way be able to additionally influence the damping behavior of the inertial mass.

Another measure for influencing the damping of the absorber system involves the application or integration of piezoceramic elements on or in the torsion elements 3. On the one hand, the piezoceramic materials are able to generate electrical voltage upon deformation, which can be correspondingly diverted to a technical application, while on the other hand, such piezoceramics can be suitably electrically actuated to additionally stiffen the torsion elements, as a result of which more influence can be exerted on the torsional stiffness of the torsion elements and the dynamics for a variability of torsional stiffness associated therewith.

Another possible way to influence the damping effect of the absorber system is to provide a through opening along each individual torsion element. Since the torsion elements 3 are also surrounded by the fluid inside the hollow shaft just like the inertial mass 15, the fluid can pass through the through opening along the torsion elements, thereby improving the interaction between the fluid and torsion elements.

In addition, when axially shifting the inertial mass 15 with the actuator 13 along the torsion elements 3, the through openings present are covered depending on the axial position of the inertial mass 15. The through openings can here be configured to adjust damping by changing the torsional stiffness. It is also conceivable to alter the shape and size of the through openings inside the torsion elements or completely close them, for example with suitably designed sliders.

All of the aforementioned measures help to individually influence the dampening of the rotational dynamic oscillation absorber.

The electrodynamic transducer offers another possible way to dampen the rotational dynamic oscillation absorber depicted on FIG. 4. For example, if the inertial mass 15 is a permanent magnetic material, and the hollow shaft (not shown on FIG. 4) is made out of an electrically conductive material, a voltage is induced by the relative movement between the inertial mass 15 and hollow shaft inside the hollow shaft, which can be regarded as a coil. This electrical voltage can either be used to operate a technical consumer in the sense of electrical energy acquisition (energy harvesting), or converted into Ohmic heat with a suitably selected electrical resistor. In this way, a continuously adjustable Ohmic resistor can be used to continuously change the damping level in a similar manner.

The shaft arrangement configured according to the invention and described above can be integrated into a shaft with continuously adjustable torsional stiffness that relays both rotational motions and torques, for example which is contained in internal combustion engines, compressors, pumps, machine tools and similar systems that perform rotational motions to avoid or reduce rotational oscillation resonances.

The shaft arrangement according to the invention can be used as a torsion oscillation dynamic vibration absorber or neutralizer, in which the active frequency of the absorber/neutralizer can be continuously adjusted by changing the torsional stiffness. This enables an adjustment of variable resonance frequencies in the case of an absorber, and to variable excitation frequencies in the case of a neutralizer.

In conclusion, reference is made to using the shaft arrangement for realizing a power steering system for motor vehicles. The shaft arrangement according to the invention is integrated along the steering column to convey torque from the steering wheel to the steering gear. This makes it possible to adjust the torsional stiffness of the steering column within a wide range. In electrically or hydraulically assisted power steering systems, this supporting force can be regulated by two rotational angle sensors. Viewed from the direction of the steering wheel, one rotational angle sensor is positioned in front, and the other in back of the shaft arrangement according to the invention with adjustable torsional stiffness. When regulating the torsional stiffness of the steering column, steering assistance unit can be subjected to speed-dependent regulation as a function of the vehicle speed. The advantage to this is that the difference between the easiest and most difficult setting becomes very great.

REFERENCE LIST

1 First shaft section
2 Second shaft section
3 Torsion element
4 Opening
5 Rotational axis
6 Effective axial length of torsion element, distance between two shaft sections
7 Drive section of shaft
8 Axially movable carriage
9 Shaft output section
10 Groove
11 Pivot bearing
12 Axially mechanical stop
13 Actuator
14 Wedge bond
15 Inertial mass
16 Through channel
M Means
H Hollow shaft

The invention claimed is:

1. A shaft arrangement for transmitting torques acting around a rotational axis and having a variably adjustable torsional stiffness acting around the rotational axis, comprising:
   a first shaft section including at least one torsion element secured thereto for transmitting the torques which is mounted to be dimensionally stable transverse to the rotational axis;
   a second shaft section spaced axially apart from the first shaft section to which the at least one torsion element is secured to not be rotatable relative thereto but is axially movable relative thereto;
   means for interacting with the second shaft section and for axially moving the second shaft section in relation to the first shaft section and to the at least one torsion element; and wherein the first shaft section is connected with a drive and the second shaft section is as inertial mass at rest in relation to the first shaft section;

the first and second shaft sections are disposed inside a hollow shaft; and the first shaft section is joined to the hollow shaft, is not rotatable relative thereto, is axially rigid and the second shaft section is spaced apart from the hollow shaft.

2. The shaft arrangement according to claim 1, wherein: the second shaft section includes an axially oriented opening with a cross sectional opening corresponding to a cross sectional shape of the at least one torsion element for joining the at least one torsion element to the second shaft section, the at least one torsion element not being rotationable relative to the second shaft but being axially movable relative to the second shaft.

3. The shaft arrangement according to claim 2, wherein: the at least one torsion element comprises a single torsion element.

4. The shaft arrangement according to claim 3, wherein: the adjustable torsional stiffness acting around the rotational axis is variable, the at least one torsion element between the first and second shaft sections is axially extendable and the axial extension of the at least one torsion element is continuously varied by the means for interacting changing an axial distance between the first and second shaft sections.

5. The shaft arrangement according to claim 4, wherein: a transducer material is applied to the at least one torsion element or integrated into the at least one torsion element.

6. The shaft arrangement according to claim 5, wherein: the transducer material is selected from at least one of the following classes of materials: piezoceramics, electroactive polymers, piezoelectric polymers, electrostrictive ceramics, magnetostrictive ceramics, smart metals or smart polymers.

7. The shaft arrangement according to claim 6, wherein: the hollow shaft is at least partially filled with an electrorheological fluid, a polymer gel, a magnetorheological fluid, a magnetorheological polymer, or an electrorheological polymer and is located at least in the at least one torsion element.

8. The shaft arrangement according to claim 3, wherein: the hollow shaft is at least partially filled with an electrorheological fluid, a polymer gel, a magnetorheological fluid, a magnetorheological polymer, or an electrorheological polymer and is located at least in the at least one torsion element.

9. The shaft arrangement according to claim 3, wherein: the means for interacting comprises one of a motorized spindle drive, a motorized linear drive, a hydraulic drive, a pneumatic drive, or a piezo drive.

10. The shaft arrangement according to claim 3 comprising an absorber or a neutralizer for suppressing resonant rotational oscillations along the shaft arrangement.

11. The shaft arrangement according to claim 2, wherein: the adjustable torsional stiffness acting around the rotational axis is variable, the at least one torsion element between the first and second shaft sections is axially extendable and the axial extension of the at least one torsion element is continuously varied by the means for interacting changing an axial distance between the first and second shaft sections.

12. The shaft arrangement according to claim 11, wherein: a transducer material is applied to the at least one torsion element or integrated into the at least one torsion element.

13. The shaft arrangement according to claim 12, wherein: the transducer material is selected from at least one of the following classes of materials: piezoceramics, electroactive polymers, piezoelectric polymers, electrostrictive ceramics, magnetostrictive ceramics, smart metals or smart polymers.

14. The shaft arrangement according to claim 11, wherein: the means for interacting comprises one of a motorized spindle drive, a motorized linear drive, a hydraulic drive, a pneumatic drive, or a piezo drive.

15. The shaft arrangement according to claim 2, wherein: the hollow shaft is at least partially filled with an electrorheological fluid, a polymer gel, a magnetorheological fluid, a magnetorheological polymer, or an electrorheological polymer and is located at least in the at least one torsion element.

16. The shaft arrangement according to claim 2, wherein: the means for interacting comprises one of a motorized spindle drive, a motorized linear drive, a hydraulic drive, a pneumatic drive, or a piezo drive.

17. The shaft arrangement according to claim 1, wherein: the adjustable torsional stiffness acting around the rotational axis is variable, the at least one torsion element between the first and second shaft sections is axially extendable and the axial extension of the at least one torsion element is continuously varied by the means for interacting changing an axial distance between the first and second shaft sections.

18. The shaft arrangement according to claim 17, wherein: a transducer material is applied to the at least one torsion element or integrated into the at least one torsion element.

19. The shaft arrangement according to claim 18, wherein: the transducer material is selected from at least one of the following classes of materials: piezoceramics, electroactive polymers, piezoelectric polymers, electrostrictive ceramics, magnetostrictive ceramics, smart metals or smart polymers.

20. The shaft arrangement according to claim 19, wherein: the means for interacting comprises one of a motorized spindle drive, a motorized linear drive, a hydraulic drive, a pneumatic drive, or a piezo drive.

21. The shaft arrangement according to claim 18, wherein: the hollow shaft is at least partially filled with an electrorheological fluid, a polymer gel, a magnetorheological fluid, a magnetorheological polymer, or an electrorheological polymer and is located at least in the at least one torsion element.

22. The shaft arrangement according to claim 18, wherein: the means for interacting comprises one of a motorized spindle drive, a motorized linear drive, a hydraulic drive, a pneumatic drive, or a piezo drive.

23. The shaft arrangement according to claim 17, wherein: the hollow shaft is at least partially filled with an electrorheological fluid, a polymer gel, a magnetorheological fluid, a magnetorheological polymer, or an electrorheological polymer and is located at least in the at least one torsion element.

24. The shaft arrangement according to claim 17, wherein: the means for interacting comprises one of a motorized spindle drive, a motorized linear drive, a hydraulic drive, a pneumatic drive, or a piezo drive.

25. The shaft arrangement according to claim 1, wherein:
the hollow shaft is at least partially filled with an electrorheological fluid, a polymer gel, a magnetorheological fluid, a magnetorheological polymer, or an electrorheological polymer and is located at least in the at least one torsion element.

26. The shaft arrangement according to claim 25, wherein:
the means for interacting comprises one of a motorized spindle drive, a motorized linear drive, a hydraulic drive, a pneumatic drive, or a piezo drive.

27. The shaft arrangement according to claim 1, wherein:
the means that operatively interacts comprises one of a motorized spindle drive, a motorized linear drive, a hydraulic drive, a pneumatic drive, or a piezo drive.

* * * * *